March 30, 1926.
F. R. OSTHEIMER
ELASTIC STEERING WHEEL FOR MOTOR VEHICLES
Filed Sept. 28, 1925
1,578,753
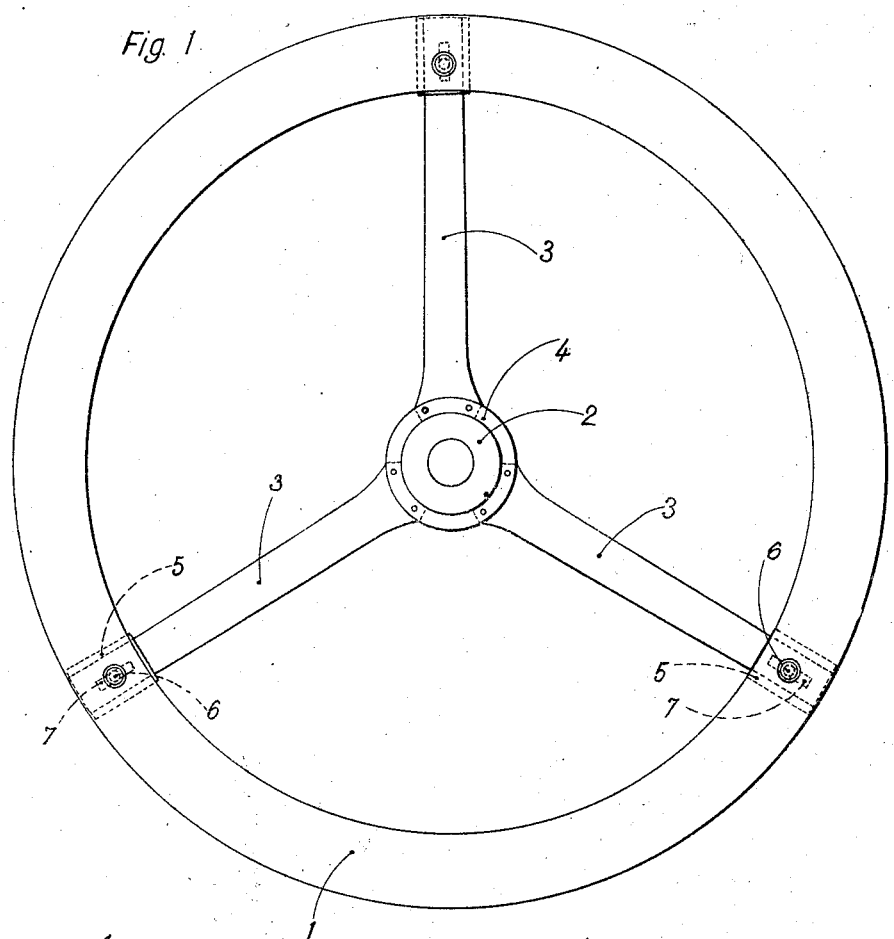
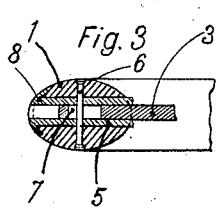
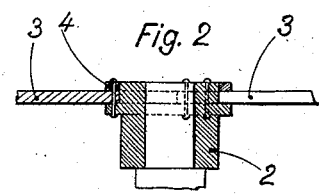
Inventor:
F. R. Ostheimer
By Marks & Clerk
Attys.

Patented Mar. 30, 1926.

1,578,753

UNITED STATES PATENT OFFICE.

FRED R. OSTHEIMER, OF PARIS, FRANCE.

ELASTIC STEERING WHEEL FOR MOTOR VEHICLES.

Application filed September 28, 1925. Serial No. 59,199.

*To all whom it may concern:*

Be it known that I, FRED R. OSTHEIMER, a citizen of the French Republic, residing at Paris, Department of the Seine, in France, have invented certain new and useful Improvements in Elastic Steering Wheels for Motor Vehicles, of which the following is a specification.

The present invention relates to improvements in elastic steering wheels for motor vehicles, and consists chiefly in a method of mounting the elastic arms in the wheel rim.

According to the said invention, there are disposed in the radial direction, and within the wheel rim, suitable sleeves serving to guide the ends of the elastic arms of the wheel which are secured to the wheel firstly by a pin traversing the said sleeve; and secondly by suitable flanges provided upon two opposite faces of the sleeve at one end of the same, said flanges bearing upon the outer surface of the wheel rim.

To enable the free motion of the said arms in their guiding sleeves, the arms comprise a slot of suitable length cooperating with the securing pins. The said improvements enable the obtainment, without any great complication, of an arrangement offering a great solidity and which even in the event of a violent shock upon the steering wheel will afford a great strength, due to the contact between the sleeve—by its outer flanges—and the wheel rim. The pin which traverses the wheel rim and the sleeve serves solely to maintain the sleeve in the wheel rim, since the effort upon the arms, due to shocks, is transmitted through the said pin to the sleeve and through the flanges of the sleeve to the wheel rim, and in virtue of the large surfaces in contact with the wheel rim, the latter will suffer no damage.

The accompanying figures from 1 to 3 are as follows:

Figure 1 is a general plan view of the steering wheel according to the invention, and Figure 2 a cross section of the hub. Figure 3 is a cross section of the wheel rim, showing the connection with the spokes.

The steering wheel according to the invention comprises the following parts; (a) the arms 3 which are three, four or five in number and consist of one or more thicknesses of sheet steel, suitably cut to shape, as indicated in Fig. 1; said arms are rigidly secured to the hub 2 by means of an outer ring 4 and suitable rivets, the cross section of the arms being preferably rectangular; (b) the metal sleeves 5 of rectangular shape in which the arms or spokes 3 are slidable, said sleeves being disposed in adequate recesses or mortises in the wheel rim 1 (Fig. 3) the sleeves 5 are secured to the wheel rim by the cross pins 6 whose heads are countersunk in the material of the said wheel rim; to allow the free motion of the spokes 3 and the sleeves 5 irrespectively of the cross pins 6, a slot 7 of sufficient length is formed in the said spokes.

The recesses or mortises adapted for the insertion of the sleeves 5 into the wheel rim, extend entirely through the rim, and the said sleeves are provided with flanges 8 at the outer ends, which are disposed on two opposite faces and at a suitable angle so as to bear properly upon the outer surface of the wheel.

The action of the said steering wheel, when subjected to the shocks of the vehicle, will be readily understood as follows. The arms or spokes 3 are slidable in their respective sleeves, and in the event of abnormal shocks, the said arms may be brought into contact with the pins 6 at the external end of the slots 7, and any one of the arms may thus exercise an effort upon its respective pin which would have the effect of shearing the pin or tearing it out of the wheel rim and thus damaging the wood if the said sleeve were not held against the outer surface of the wheel rim by the large contact surfaces afforded by the flanges 8.

The sleeves 5 are mounted in such manner that their flanges 8 are imbedded in the surface of the wheel. In the usual construction, the said flanges are not visible, since the wheel rim and in many cases even the arms are covered by a suitable sheathing.

The aforesaid parts are assembled in a very simple manner as follows:

The sleeves are placed in their respective recesses, and the wheel spokes are slipped into the respective sleeves. The spokes are then secured to the hub, as above indicated, by means of the fastening ring and adequate rivets or bolts; the assembling is terminated by securing the bolts 6 to the wheel rim; the bolts traverse the slots 7, and this, as above mentioned, will afford the relative displacement of the arrangement consisting of the wheel rim and the arms or spokes; whereby the elasticity of the said wheel is assured in the most approved manner.

Obviously, the aforesaid arrangement is not limited to the use of elastic steering wheels, and it may be employed, with or without sleeves, to provide for the use of spiders with separately secured arms, whereby the cost of construction may be reduced.

The rigid arms will be mounted in all cases, as above indicated, in the recesses in the wheel rim, and will then be secured to the hub. The utilization of such spiders will have for its object either to reduce the cost of construction, or—by the use of various material for the spokes and the hub—to obtain conditions such as elasticity, a more attractive appearance, or a shape or contact which is more agreeable to the hand, while at the same time offering no prejudice to the solidity of the apparatus, and particularly of the hub.

Claim:

In an elastic steering wheel, a plurality of spring arms having the outer ends thereof slotted, a wheel rim, guide sleeves slidably receiving the outer ends of the arms mounted in and extending throughout the entire thickness of the rim, flanges at the two opposite faces of the sleeve bearing against the outer portions of the wheel rim and pins extending through the slots and the outer ends of the arms.

In testimony whereof I hereunto affix my signature.

FRED R. OSTHEIMER.